United States Patent
Matsumiya et al.

(10) Patent No.: US 7,231,726 B2
(45) Date of Patent: Jun. 19, 2007

(54) MEASURING INSTRUMENT COVER AND MEASURING INSTRUMENT

(75) Inventors: Sadayuki Matsumiya, Kawasaki (JP); Shigeru Ohtani, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 10 days.

(21) Appl. No.: 11/042,886

(22) Filed: Jan. 25, 2005

(65) Prior Publication Data
US 2005/0166416 A1 Aug. 4, 2005

(30) Foreign Application Priority Data
Jan. 29, 2004 (JP) ............... 2004-021601

(51) Int. Cl.
*G01B 3/10* (2006.01)
*G01B 3/18* (2006.01)

(52) U.S. Cl. ............... 33/755; 33/770; 33/783
(58) Field of Classification Search ........... 33/755, 33/770, 783
See application file for complete search history.

(56) References Cited

U.S. PATENT DOCUMENTS

| 5,483,751 A | 1/1996 | Kodato | |
| 5,645,350 A * | 7/1997 | Jang | 374/158 |
| 6,182,916 B1 * | 2/2001 | Lin | 33/767 |
| 6,243,965 B1 | 6/2001 | Zanier et al. | |
| 6,382,547 B1 * | 5/2002 | Yang | 33/769 |
| 6,807,747 B1 * | 10/2004 | Hsu | 33/769 |
| 2003/0233762 A1 * | 12/2003 | Blackman et al. | 33/769 |
| 2004/0118004 A1 * | 6/2004 | Hayashida et al. | 33/815 |

FOREIGN PATENT DOCUMENTS

EP 1 074 812 A2 2/2001
JP 06-307802 11/1994

OTHER PUBLICATIONS

Patent Abstracts of Japan, Calipers Cover, Publication No. 06194104, Publication Date: Jul. 15, 1994.
Patent Abstracts of Japan, Waterproof Measuring Instrument, Publication No. 06034358, Publication Date: Feb. 8, 1994.
WO 2004/001331 A1, Tape Measure Housing With Grip Element, Publication Date: Dec. 31, 2003.

* cited by examiner

*Primary Examiner*—Christopher W. Fulton
(74) *Attorney, Agent, or Firm*—Rankin, Hill, Porter & Clark LLP

(57) ABSTRACT

A cover body (100), formed of an elastic member for covering a slider body (510) of a caliper, is provided with concavities and convexities (112) on the inner surface thereof and concavities and convexities (103) on the outer surface thereof. The cover body (100) is arranged so that it is easily deformed elastically in the portion of the concavities and convexities. When a shock is given from the outside, the portion of the concavities and convexities is deformed elastically to absorb the shock, hence the shock given to the slider body (510) is reduced. Accordingly, damage or failure hardly occurs on the measuring instrument.

11 Claims, 13 Drawing Sheets

MEASURING INSTRUMENT COVER AND MEASURING INSTRUMENT

BACKGROUND OF THE INVENTION

1. Field of the Invention

The present invention relates to a measuring instrument cover and a measuring instrument.

2. Description of Related Art

Conventionally, a caliper with digital display (Japanese Unexamined Patent Application No. Hei6-307802 (refer to FIG. 1)) is known.

The aforementioned caliper with digital display includes a main beam having one measuring jaw, a slider arranged movably on the main beam, having the other measuring jaw which abuts an object to be measured with the above mentioned the one measuring jaw, an encoder for detecting a moved displacement of the slider with respect to the main beam and a digital display for digitally displaying the moved displacement amount.

While measuring, however, user may accidentally drop the caliper with digital display on the floor or hit the caliper against another object, and the caliper may be damaged, or relevant shock may cause failure on the encoder or the digital display. So, there resides such a problem that the caliper fails in precisely detecting the moved displacement or precisely displaying measured values.

SUMMARY OF THE INVENTION

A major object of the present invention is to provide a measuring instrument cover, which is attached to a measuring instrument, thereby preventing the measuring instrument from being damaged or failing due to shock from the outside, and a measuring instrument, thereby preventing from being damaged or failing due to shock from the outside.

A measuring instrument cover according to the present invention includes a cover body formed of an elastic member for covering at least a part of a measuring instrument, and concavities and convexities which are formed on at least either of the inner surface of the cover body, which abuts the measuring instrument, or the outer surface on the opposite side of the inner surface.

Since the cover body is formed of an elastic member, even when a user accidentally drops the measuring instrument, which the measuring instrument cover is attached to, on the floor, the measuring instrument cover will reduce the shock to the measuring instrument. Owing to this, the measuring instrument can be prevented from being damaged or failing.

Further, the measuring instrument cover according to the present invention is arranged to be easily elastically deformed in a portion where concavities and convexities are formed on the cover body. Owing to this, when a shock is given to the measuring instrument from the outside, the portion of the concavities and convexities of the measuring instrument cover is deformed elastically so as to absorb the shock. Thus the shock given to the measuring instrument is reduced. Accordingly, the measuring instrument will hardly be damaged or fail.

According to the present invention, the measuring instrument cannot be touched directly by the hands. Thus, the measuring instrument is prevented from suffering a failure due to the heat of the hands. And, since the cover body covers the measuring instrument, the measuring instrument is prevented from getting dirty.

It is preferable in the present invention that the measuring instrument includes a display section for displaying measured values, and the cover body has an opening for exposing the display section and a tapered section formed in the vicinity of the opening, wherein the thickness of the tapered section becomes thinner toward the opening.

According to the present invention, due to the fact that a tapered section is formed in such a way that the thickness of the cover body becomes thinner toward the opening, the visibility of the displayed figures on the display section, which is exposed in the opening, is not obstructed because of the thickness of the cover body.

Further, the present invention is preferably arranged so that the concavities and convexities formed on the inner surface of the cover body form one or a plurality of spillways, and at least one end of the spillways is opened.

When the measuring instrument is used in such a situation that oil and/or cooling fluid or the like readily come into contact therewith, the oil and/or cooling fluid may penetrate into between the inner surface of the cover body and the surface of the measuring instrument. However, according to the present invention, the spillways formed on the inner surface of the cover body guide the oil and/or cooling fluid and spill the same away through the opened end of the spillways.

Particularly, when a user holds the cover body with his hands for carrying out measurement, the oil and/or cooling fluid will be spilt away more smoothly. That is, since the inner surface of the cover body is pushed against the surface of the measuring instrument due to the holding force of the hands of the user, the oil and/or cooling fluid residing therebetween are readily pressed out into the spillways formed on the inner surface of the cover body. Further, since the cover body is formed of an elastic member, the spillways are constricted by the holding force of the hands, and the oil and/or cooling fluid are readily pressed out through the opened end of the spillways.

Further, the present invention is preferably structured so that the other end of the spillways is closed in the vicinity of the opening.

According to the present invention, since the spillways are closed at the other end in the vicinity of the opening, the oil and/or cooling fluid residing between the inner surface of the cover body and the surface of the measuring instrument are not spilt toward the display section exposed in the opening. Owing to this, the display section does not get dirty due to the oil and/or cooling fluid. Accordingly, the visibility of the measured values displayed on the display section is not obstructed.

Further, the present invention is preferably structured so that the cover body includes an outer layer molded at the outer surface side and an inner layer molded integrally with the outer layer at the inner surface side, wherein the outer layer is formed of a hard elastic member and formed with the concavities and convexities on the surface thereof, and the inner layer is formed of a soft elastic member.

According to the present invention, since the inner layer formed of a soft elastic member abuts the measuring instrument, the shock absorption is further secured.

Being formed of a soft elastic member, the inner layer can be deformed elastically to fit with the configuration of the surface of the measuring instrument. Accordingly, the inner layer of the cover body and the measuring instrument come into close contact with each other, thus the oil and/or cooling fluid are prevented from penetrating therebetween.

Since the configuration of the inner layer formed of a soft elastic member is hardly maintained by its own, the outer layer of a hard elastic member is formed to maintain a predetermined configuration of the inner layer. Owing to this, the measuring instrument cover of the present invention can be attached to or detached from the measuring instrument without spoiling the above-described effects obtained from the inner layer that is formed of the soft elastic member. That is to say, even when the measuring instrument cover is detached from the measuring instrument, since the outer layer is hard, the configuration of the measuring instrument cover can be maintained until the measuring instrument cover is attached to the measuring instrument again. Owing to this, there arises no problem due to deformation of the measuring instrument cover when the same is attached to the measuring instrument again.

Further, in the present invention it is preferable that the cover body is molded integrally with the measuring instrument so that the inner surface thereof contacts closely with the surface of the measuring instrument, and the outer surface thereof is formed with the concavities and convexities.

According to the invention, the cover body and the measuring instrument are molded integrally and the inner surface of the cover body and the surface of the measuring instrument are in close contact with each other. Accordingly, the oil and/or cooling fluid are prevented from penetrating therebetween.

Further, in the present invention, it is preferable that the cover body is opened at one side of the measuring instrument, and a surface protection section is formed on the periphery of the opening portion for covering the periphery of the one side of the measuring instrument.

As for the above-mentioned one side of the measuring instrument, the bottom surface is the most effective one. Any other surface, however, may be selected. When the cover body is opened at bottom surface of the measuring instrument, the other surfaces of the measuring instrument are to be covered by the cover body. Accordingly, the desired protection performance is obtained, and furthermore, the shock mitigation effect on the bottom surface side of the measuring instrument owing to the surface protection section on the periphery is obtained.

Further, according to the present invention, such a measuring instrument can be structured that includes a measuring instrument body having concavities and convexities on at least a part of the surface thereof, and a coating having elasticity and being coated on the portion of the concavities and convexities on the surface of the measuring instrument body.

According to the invention, since the coating has elasticity, even when the measuring instrument of the present invention is accidentally dropped on the floor, the coating mitigates the shock given to the measuring instrument body. Owing to this, the measuring instrument can be prevented from being damaged or failing.

Also, according to the invention, since the concavities and convexities are formed on the surface of the measuring instrument body, the coating also, which is formed so as to fit the configuration of the surface of the measuring instrument body, has the configuration of the concavities and convexities. The concavities and convexities on the surface of the measuring instrument body are formed to mitigate the shock from the outside. On the concavities and convexities of the measuring instrument body, the elastic coating having the configuration of the concavities and convexities is additionally formed. The coating is deformed elastically so as to absorb the shock from the outside, and thus the shock given to the measuring instrument body is further reduced.

Further, according to the invention, there reside no gaps between the surface of the measuring instrument body and the coating. Accordingly, the oil and/or cooling fluid are prevented from penetrating therebetween.

DETAILED DESCRIPTION OF PREFERRED EMBODIMENTS

Embodiments of the present invention will be described with reference to the drawings.

First Embodiment

Figure 1:
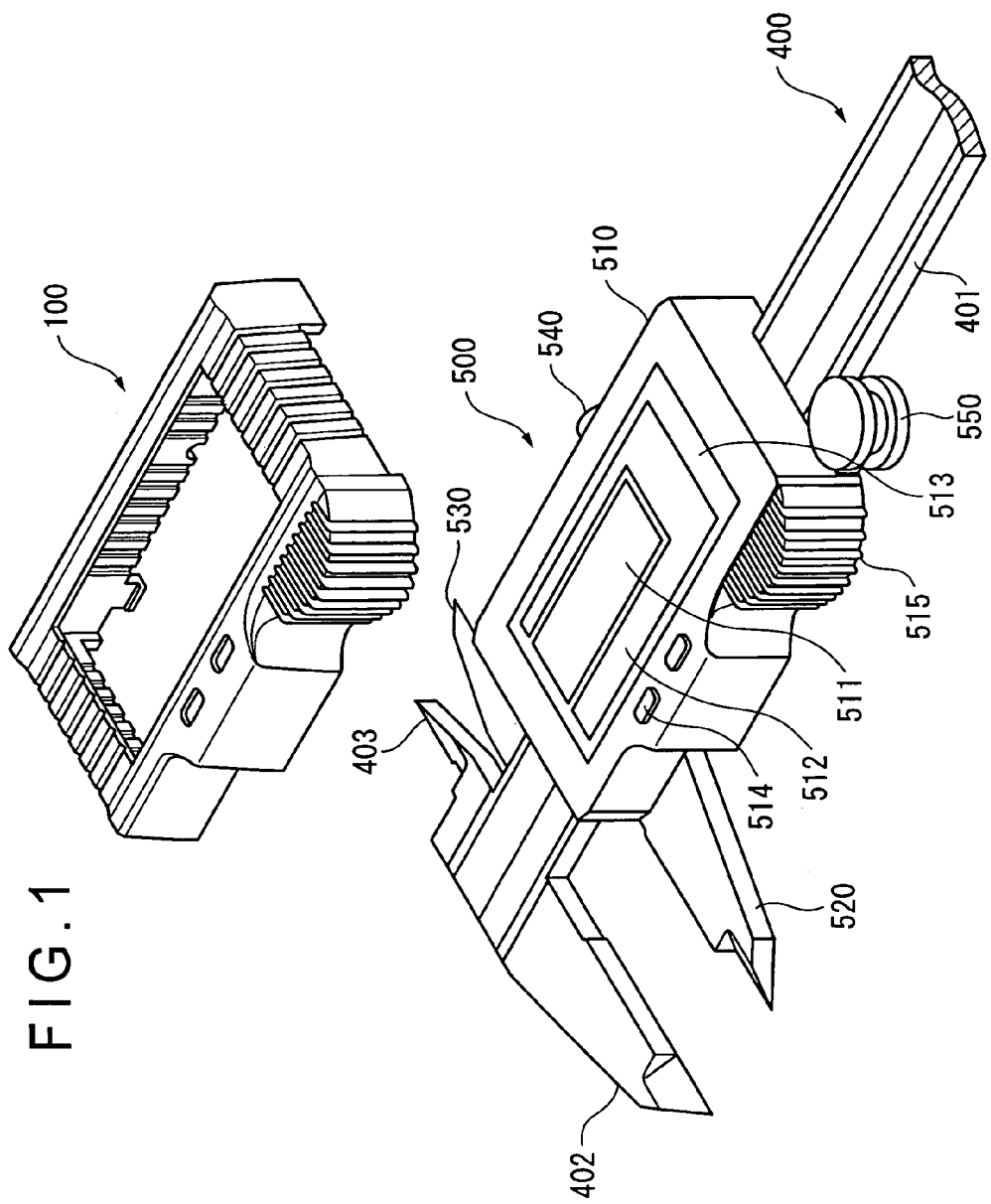
FIG. 1 is a perspective view showing a caliper and a measuring instrument cover attached to the caliper according to a first embodiment of the present invention.

FIG. 1 is a perspective view showing a caliper and a measuring instrument cover attached to the caliper according to a first embodiment of the present invention. A caliper as a measuring instrument includes a main beam 400 and a slider 500, which is disposed on the main beam 400 in a slidable manner along the longitudinal direction thereof.

The main beam 400 includes a main beam body 401 having a long plate-like shape, which has a rectangular shape in section, an outside dimension measuring jaw 402 and an inside dimension measuring jaw 403, both of which are provided at one end (left-side end in FIG. 1) of the main beam body 401.

The slider 500 includes a slider body 510 made of an acrylic resin with a substantially rectangular parallelepiped-like shape, an outside dimension measuring jaw 520, which is provided at one end side (left end side in FIG. 1) of the slider body 510 and abuts an object to be measured with the outside dimension measuring jaw 402, an inside dimension measuring jaw 530, which is provided at one end side of the slider body 510 and abuts an object to be measured with the inside dimension measuring jaw 403, a clamp screw 540, which is provided on a side surface of the slider body 510, for securing the slider 500 on the main beam 400, and a pressure roller 550, which is provided at the other end side (right end side in FIG. 1) of the slider body 510, for sliding the slider 500 with respect to the main beam 400 by being pressed and rolled by a finger.

Inside the slider body 510, an encoder (not shown), which outputs electric signals corresponding to the sliding amount of the slider 500, is provided. On the upper surface of the slider body 510, a digital display 511 as a display section is provided, which computes linear dimension of an object to be measured based on the electric signals outputted from the encoder and digitally displays the linear dimension thereon. Further, the slider body 510 includes a solar cell 512 disposed in the periphery of the digital display 511 for supplying the power to the encoder, the digital display 511 or the like, a transparent protection cover 513 which covers the digital display 511 and the solar cell 512 and a switch section 514 for switching, for example, dimensional units of the measured values which are displayed on the digital display 511. On a side surface of the slider body 510 a finger rest 515 is provided in the vicinity of the pressure roller 550.

The measuring instrument cover includes a cap-like cover body 100 having a substantially rectangular parallelepiped-shape molded out of an elastomer as an elastic member. The cover body 100 is for covering the slider body 510 from the top thereof.

Figure 2:
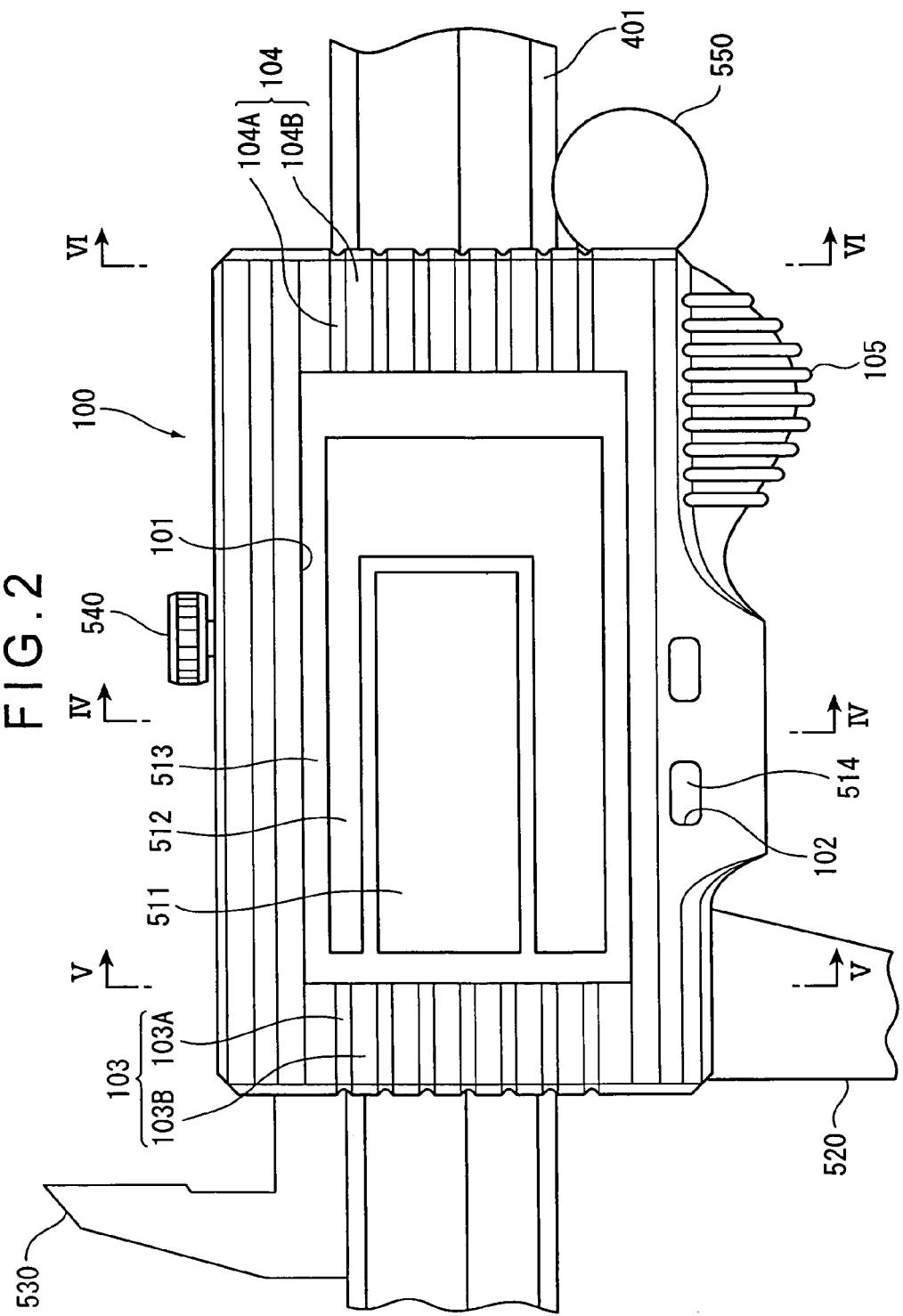
FIG. 2 is a plan view showing a state where a cover body of the measuring instrument cover according to the first embodiment is attached to a slider body.

FIG. 2 is a plan view showing a state where the cover body 100 is attached to the slider body 510. As shown in FIG. 2, a rectangular opening 101 is formed in the upper surface of the cover body 100. And in the vicinity of the lower edge of the opening 101 in FIG. 2, an opening 102 for switch section 514 is formed. In the left side of the opening 101, a plurality of cover surface grooves 103A and convexities 103B are formed on the surface of the cover body 100. The cover surface grooves 103A are formed at regular intervals. And the respective cover surface grooves 103A is formed in the leftward direction, and its one side end is opened at left edge of the opening 101. The convexities 103B are formed between the respective cover surface grooves 103A. In the right side of the opening 101, a plurality of cover surface grooves 104A and convexities 104B are formed on the surface of the cover body 100. The cover surface grooves 104A are formed at regular intervals. And the respective cover surface grooves 104A is formed in the rightward direction, and its one side end is opened at right edge of the opening 101. The convexities 104B are formed between the respective cover surface grooves 104A.

And formed on the side surface of the cover body 100 is a finger rest cover 105 for covering the finger rest 515.

The opening 101 is for allowing the digital display 511 and the solar cell 512 to be exposed through the protection cover 513, when the cover body 100 is attached to the slider body 510. Owing to this, measured values on the digital display 511 can be read and the solar cell 512 can absorb the light from the outside to generate the electricity.

The opening 102 is for allowing the switch section 514 to be operated even when the cover body 100 is attached to the slider body 510.

The cover surface grooves 103A and the convexities 103B form the concavities and convexities 103; and the cover surface grooves 104A and the convexities 104B form the concavities and convexities 104; thus the concavities and convexities are formed on the outer surface of the cover body 100.

Figure 3:
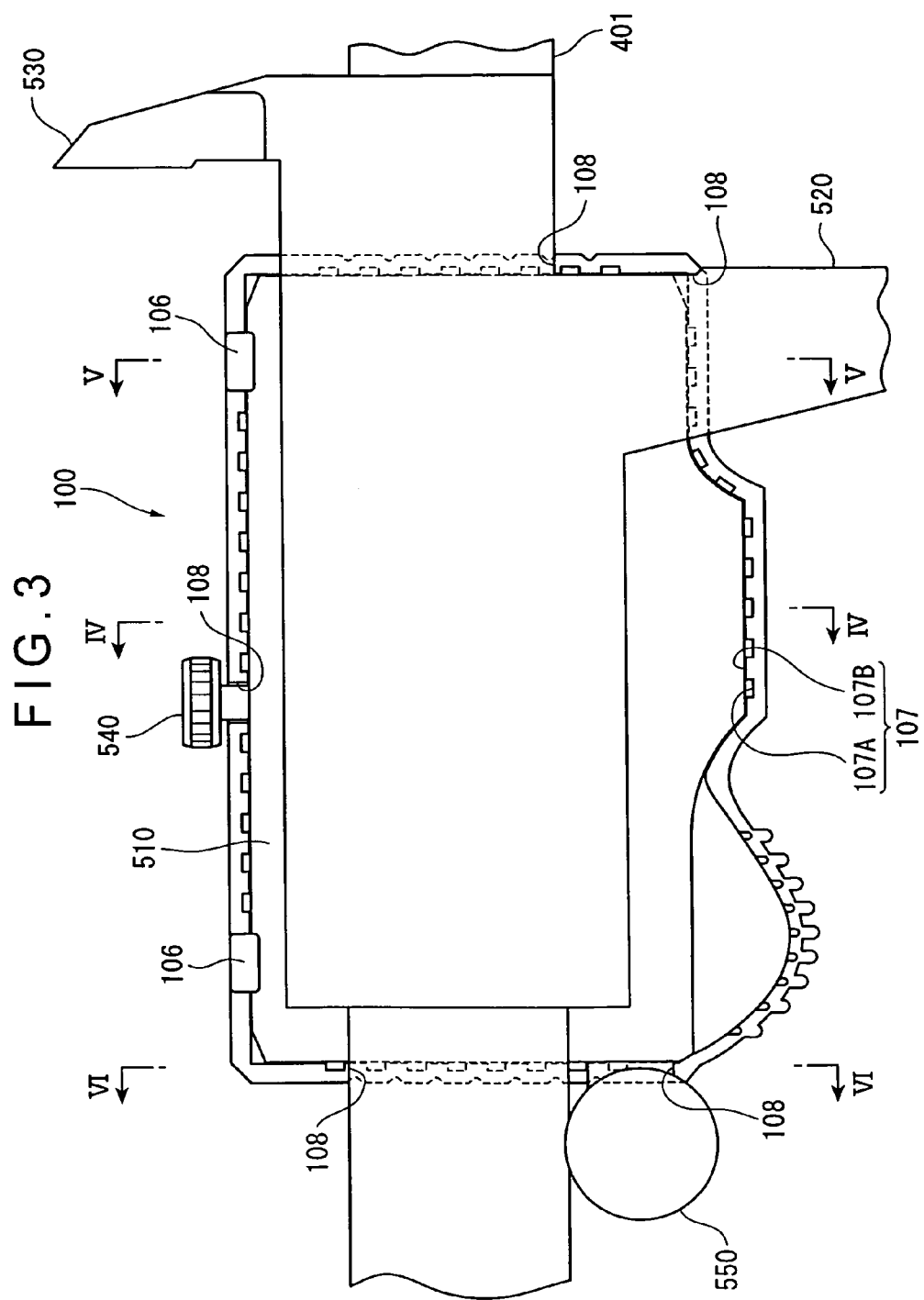
FIG. 3 is a bottom plan view showing a state that the cover body of the measuring instrument cover according to the first embodiment is attached to the slider body.

FIG. 3 is a bottom plan view showing a state that the cover body 100 is attached to the slider body 510. The measuring instrument cover is attached to the slider body 510 by means of two latching pieces 106.

Formed on the inner surface (surface abutting the slider body 510) of the cover body 100 is a plurality of cover inner surface grooves 107A as spillways, which are formed in the direction perpendicular to the drawing plane in FIG. 3. And convexities 107B are formed between the respective cover inner surface grooves 107A. The cover inner surface grooves 107A and the convexities 107B form many concavities and convexities 107 on the inner surface of the cover body 100.

On the cover body 100, plural cut portions 108 are formed so that the main beam body 401, the outside dimension measuring jaw 520, the inside dimension measuring jaw 530, the clamp screw 540 and the pressure roller 550, are exposed to the outside of the cover body 100.

Figure 4:
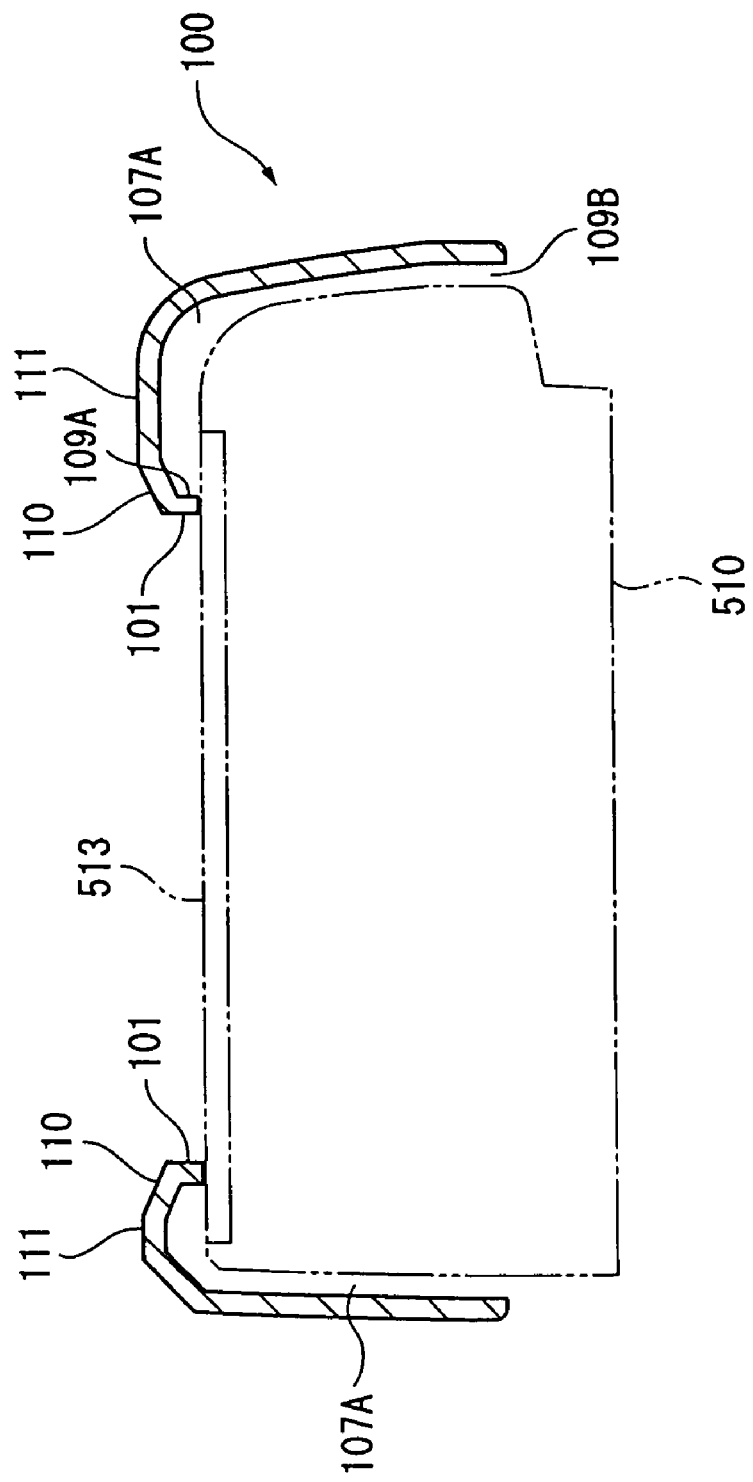
FIG. 4 shows a section of the first embodiment taken along the line IV-IV in FIGS. 2 and 3.

FIG. 4 shows a sectional view taken along the line IV-IV in FIGS. 2 and 3.

As shown in FIG. 4, the cover inner surface grooves 107A are formed along the surface of the slider body 510 from one end 109A in the vicinity of the opening 101 to the other end 109B. The one end 109A is closed by the elastomer constituting the cover body 100, and the other end 109B is opened. Accordingly, one side ends (109B) of the spillways (107A) are opened, and the other side ends (109A) are closed in the vicinity of the opening (101).

On the upper surface of the cover body 100, a tapered section 110, which is formed in the vicinity of the opening 101 and has such a configuration that the thickness of the cover becomes thinner toward the opening 101, and a projected portion 111, which is formed next to the tapered section 110 and is projected in the upward direction in FIG. 4, are provided.

Figure 5:
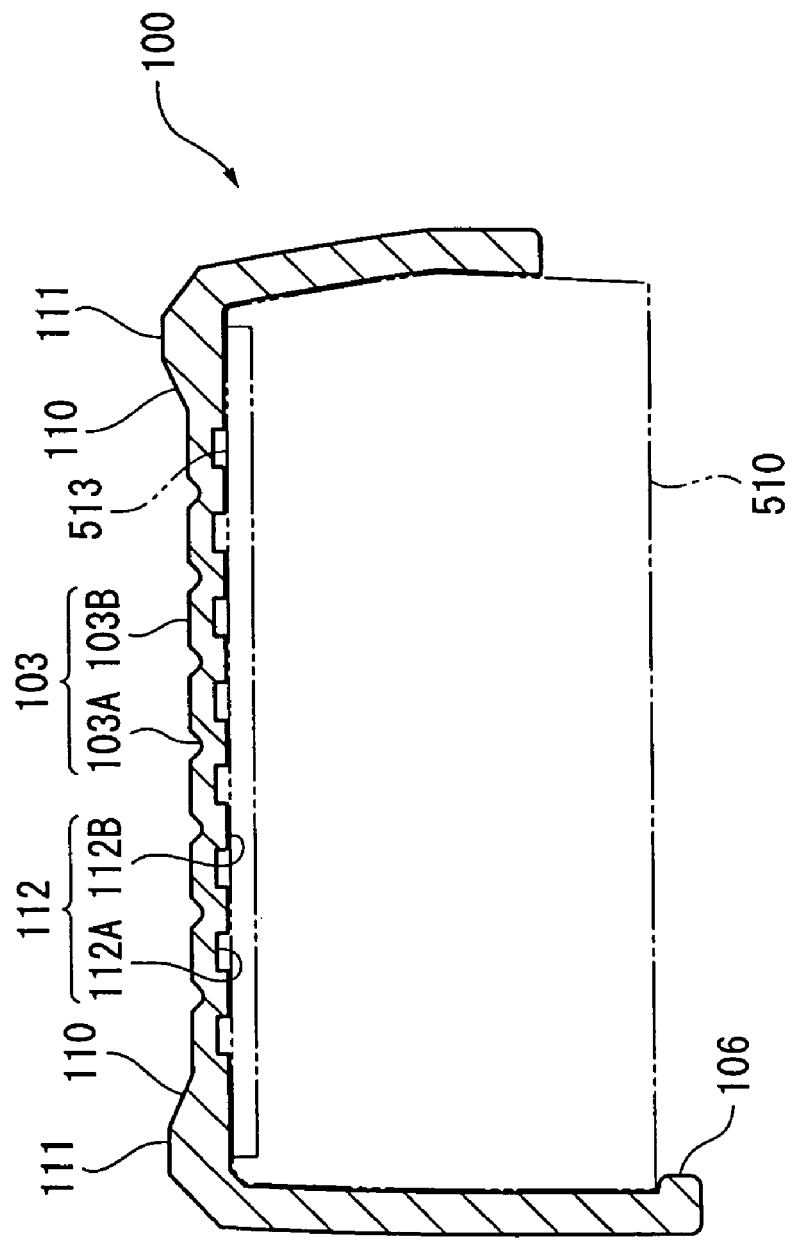
FIG. 5 shows a section of the first embodiment taken along the line V-V in FIGS. 2 and 3.

FIG. 5 shows a sectional view taken along the line V-V in FIGS. 2 and 3.

On the inner surface of the cover body 100, cover inner surface grooves 112A as the spillways are formed with regular intervals so that the cover inner surface grooves 112A and the cover surface grooves 103A are disposed alternately, and between the cover inner surface grooves 112A, the convexities 112B are formed so that the convexities 112B and the convexities 103B are disposed alternately. The cover inner surface grooves 112A and the convexities 112B form the concavities and convexities 112 on the inner surface of the cover body 100.

The cover inner surface grooves 112A are formed from the closed end (not shown) in the vicinity of edge of the opening 101 (in FIG. 2) along the surface of the slider body 510, and the cover inner surface grooves 107A (refer to FIG. 6), as will be described later, are continuously formed and opened at the end thereof.

Figure 6:
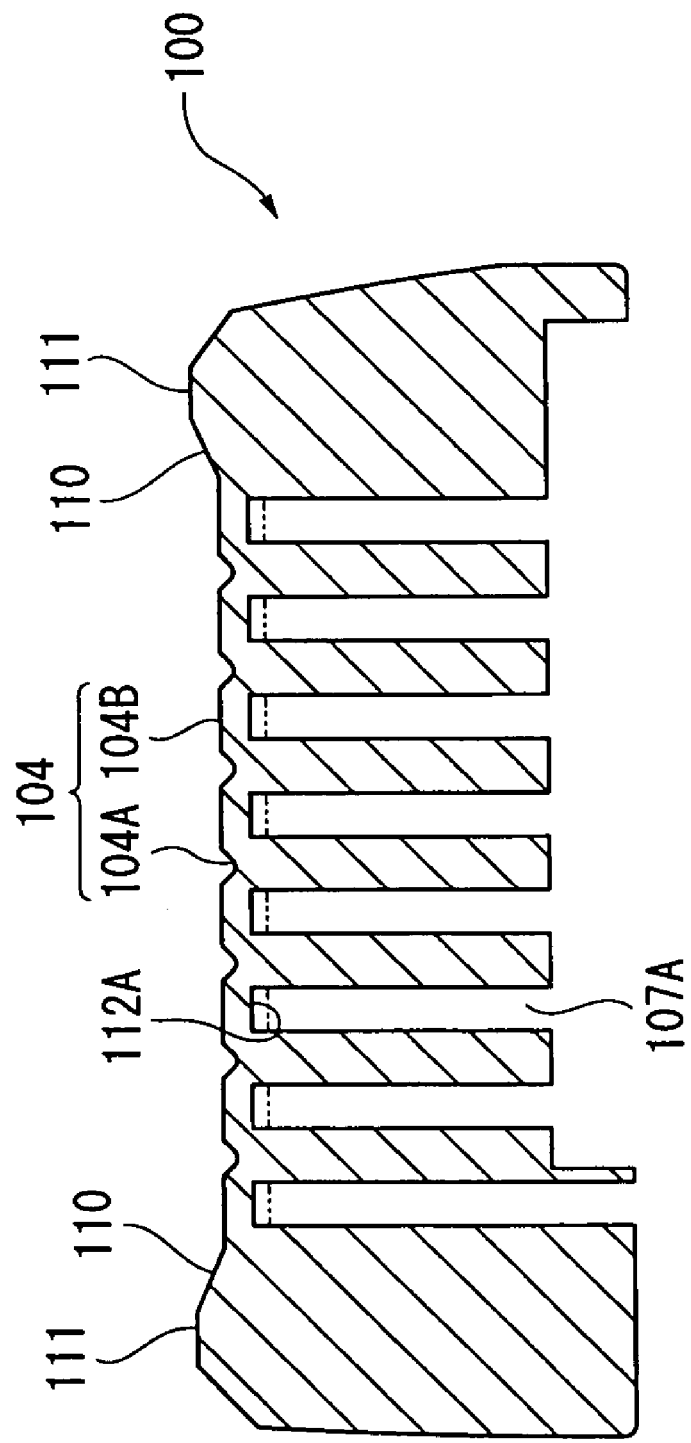
FIG. 6 shows a section of the first embodiment taken along the line VI-VI in FIGS. 2 and 3.

FIG. 6 shows a sectional view taken along the line VI-VI in FIGS. 2 and 3.

The cover inner surface grooves 107A are formed in the vertical direction continuously with the cover inner surface grooves 112A in the direction perpendicular to the drawing plane in FIG. 6. As described above, the lower ends (in FIG. 6) of the cover inner surface grooves 107A are opened. Owing to this arrangement, a groove which is formed by the cover inner surface groove 112A and the cover inner surface groove 107A, as described above, is opened at one side end (lower end of the cover inner surface groove 107A), and is closed at the other side end (not shown) in the vicinity of the edge of the opening 101. Owing to this, one side ends of the spillways (formed by grooves 112A and grooves 107A) are opened, and the other side ends are closed in the vicinity of the opening (101).

According to the embodiment of the present invention, the following effects are obtained.

(1) The cover body 100 is molded out of elastomer. Accordingly, even when a user accidentally drops the caliper on the floor in the state that the measuring instrument cover is attached to the slider body 510, the shock given to the slider body 510 is absorbed; thus it is possible to prevent damage of the encoder and the like and prevent a failure of measurement.

(2) The concavities and convexities 103, 104, 107 and 112 are formed on the cover body 100. When a shock is given from the outside, each of the concavity and convexity portions are deformed elastically so as to absorb the shock. Owing to this, the shock given to the slider body 510 is absorbed; thus, damage of the slider body 510 is prevented.

(3) By attaching the measuring instrument cover, the slider body 510 is prevented from being touched directly by the hands of users. Accordingly, it is possible to prevent malfunction of electronic components used for the encoder and/or the digital display 511 caused by heat of the hands. Also, since the cover body 100 covers the slider body 510, the slider body 510 is prevented from getting dirty or the like.

(4) The tapered section 110 is formed beside the opening 101. Accordingly, the visibility of the figures displayed on the digital display 511 is hardly obstructed because of the thickness of the cover body 100.

(5) Even when oil and/or cooling fluid penetrates between the cover body 100 and the slider body 510, those fluid can be spilt away from the opened ends of the cover inner surface grooves 107A and 112A.

(6) Particularly, each of the cover inner surface grooves is closed at the respective ends in the vicinity of the opening 101. Accordingly, the oil and/or cooling fluid are not spilt from the wall surface of the opening 101 onto the protection cover 513 of the caliper. Owing to this, it is possible to prevent visibility obstruction of a displayed figure on the digital display 511 and reduction of electricity generated by the solar cell 512 due to the oil and/or cooling fluid.

(7) When the caliper is in use, measurement is carried out with the cover body 100 being held by the hands. Owing to the holding force of the hands, the inner surface of the cover body 100 is pressed against the surface of the slider body 510. Thus, the oil and/or cooling fluid which reside therebetween are readily pressed out to the cover inner surface grooves 107A and 112A. Further, owing to the holding force of the hands, each of the cover inner surface grooves are compressed and deformed so that the oil and/or cooling fluid are pressed out from the grooves. Accordingly, the oil and/or cooling fluid can be spilt away more smoothly from the opened end of the cover inner surface grooves.

(8) The concavities and convexities 103 and 104 are formed on the surface of the cover body 100. Accordingly, the cover body 100 fits with the hands and is easy to be held; thus, the operability thereof is improved.

(9) On the upper surface of the cover body 100, the cover surface grooves 103A and 104A are formed, which have opened ends at the left edge and right edge of the opening 101. Accordingly, the oil and/or cooling fluid on the protection cover 513 of the caliper are removed from the protection cover 513 through the grooves on the cover surface. Thus, it is possible to prevent the visibility obstruction of the digital display 511 and the reduction of electricity generated by the solar cell 512 due to the oil and/or cooling fluid.

(10) The projected portion 111 is formed on the upper surface of the cover body 100. Owing to the projected portion 111, the protection cover 513 of the caliper is protected from hitting external objects. Accordingly, the protection cover 513 hardly get damaged; thus it is possible to prevent the visibility obstruction of the digital display 511 and the reduction of electricity generated by the solar cell.

(11) The measuring instrument cover is attached detachably to the slider body 510 by means of the latching pieces 106. Therefore, even when the measuring instrument cover gets dirty or damaged, the measuring instrument cover can be readily replaced.

Second Embodiment

Next, a second embodiment of the present invention will be described. The components equivalent to those of the first embodiment will be given with the same reference numerals and the description thereof will be omitted or made just simple.

Figure 7:
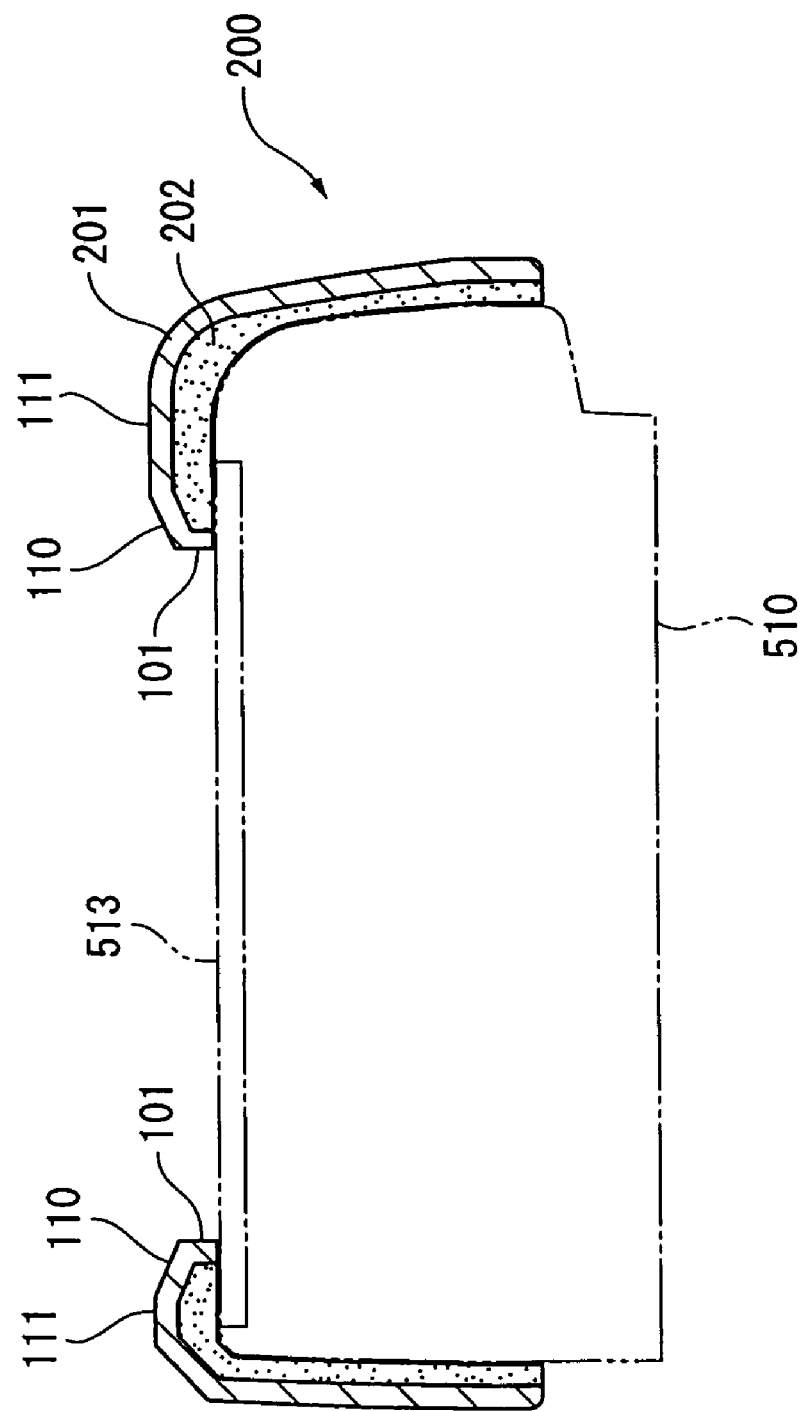
FIG. 7 shows the equivalent section of a second embodiment as the section taken along the line IV-IV in FIG. 2.
Figure 8:
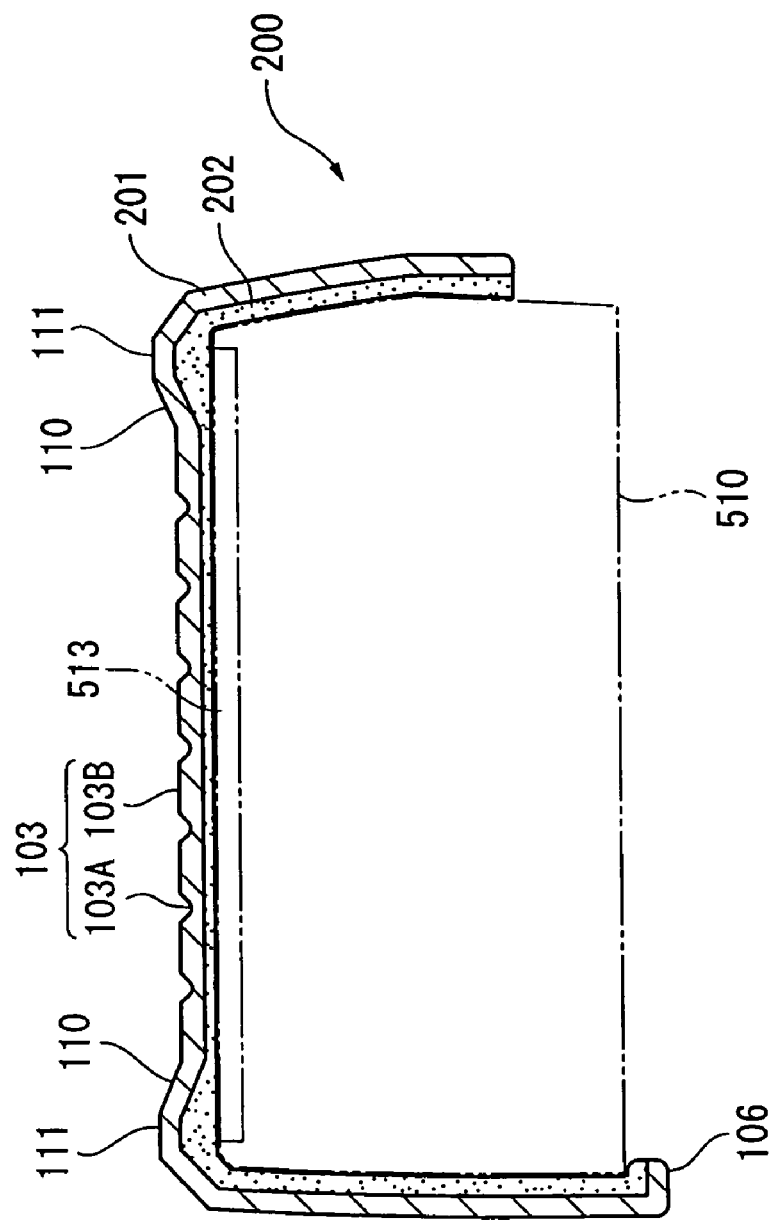
FIG. 8 shows the equivalent section of the second embodiment as the section taken along the line V-V in FIG. 2.

FIG. 7 shows an equivalent section taken along the line IV-IV in FIG. 2. FIG. 8 shows an equivalent section taken along the line V-V in FIG. 2.

As shown in these figures, the cover body 200 has a double-layered structure integrally molded by coinjection process. That is, an outer layer 201, which is molded out of a synthetic resin as a hard elastic member and is formed at the outer surface side of the cover body 200, and an inner layer 202, which is molded out of a silicone rubber as a soft elastic member and is formed at the inner surface side of the cover body 200. On the surface of the outer layer 201, concavities and convexities 103 and 104 (refer to FIG. 2) are formed.

Being different from the first embodiment, grooves equivalent to the cover inner surface grooves 107A the 112A or convexities equivalent to the convexities 107B and 112B are not formed. Accordingly, on the inner surface of the cover body 200, any concavities or convexities are not formed. Thus, the slider body 510 and the inner layer 202 come into close contact with each other with no gaps therebetween.

According to the second embodiment, in addition to the effects in the first embodiment, the following effects are obtained.

(12) The inner layer 202 formed of the soft silicone rubber directly covers the slider body 510. Accordingly, a shock to the slider body 510 can be further absorbed.

(13) Also, the inner layer 202 is molded out of the soft silicone rubber. Accordingly, when the inner layer 202 comes into close contact with the slider body 510, the inner layer 202 is elastically deformed so as to fit with the surface configuration of the slider body 510. Since the gap between the inner layer 202 and the slider body 510 is filled in by the elastic deformation, the oil and/or cooling fluid can be prevented from penetrating therebetween.

(14) Since the hard outer layer 201 is formed integrally with the soft inner layer 202 contacting closely with each other, the configuration of the cover body 200 is not deformed. Particularly, even when the cover body 200 is detached from the slider body 510, the configuration thereof is maintained. Therefore, there arises no difficulty in reattaching the cover body 200 to the slider body 510. Thus, the measuring instrument cover is capable of being attached to and detached from the slider body 510. Even when the measuring instrument cover gets dirty or damaged, the measuring instrument cover can be readily replaced.

Third Embodiment

Next, a third embodiment of the present invention will be described. The components equivalent to those of the first or second embodiment will be given the same reference numerals and the description thereof will be omitted or made just simple.

Figure 9:
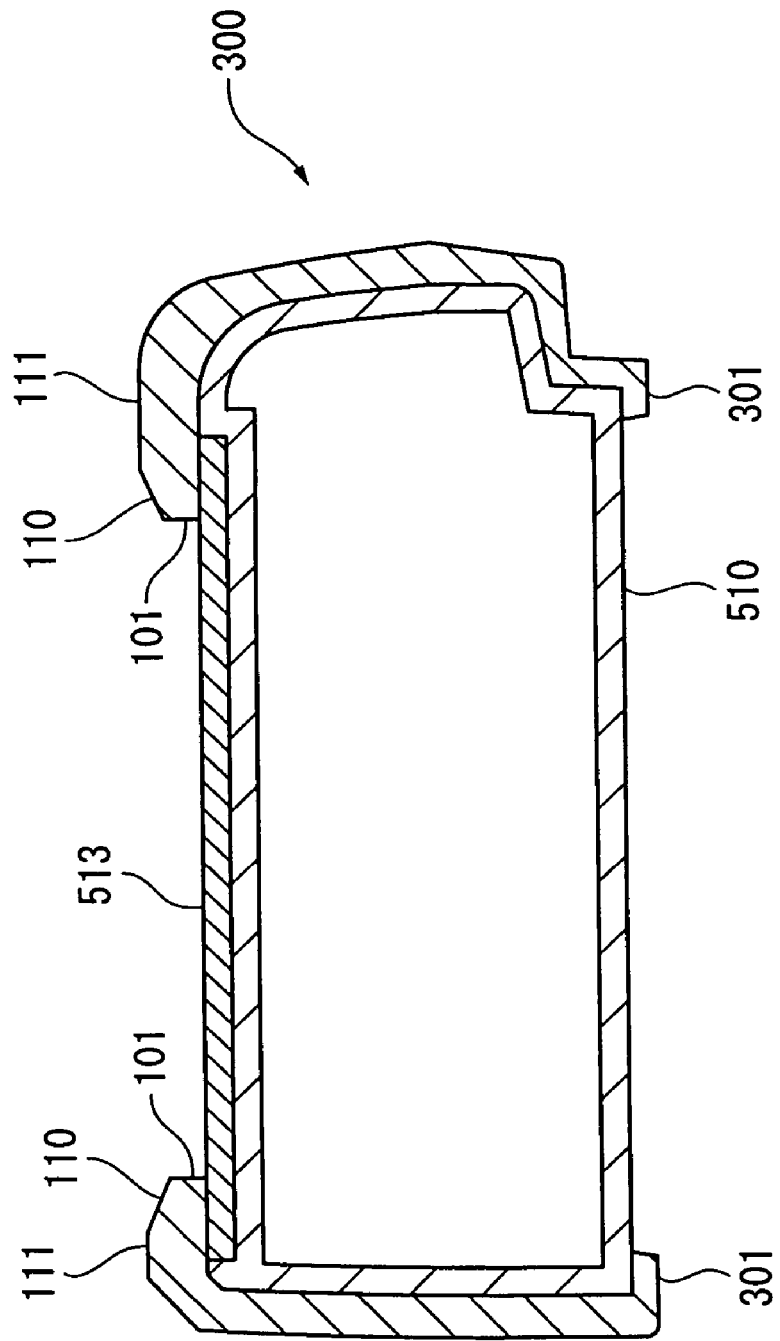
FIG. 9 shows the equivalent section of a third embodiment as the section taken along the line IV-IV in FIG. 2.
Figure 10:
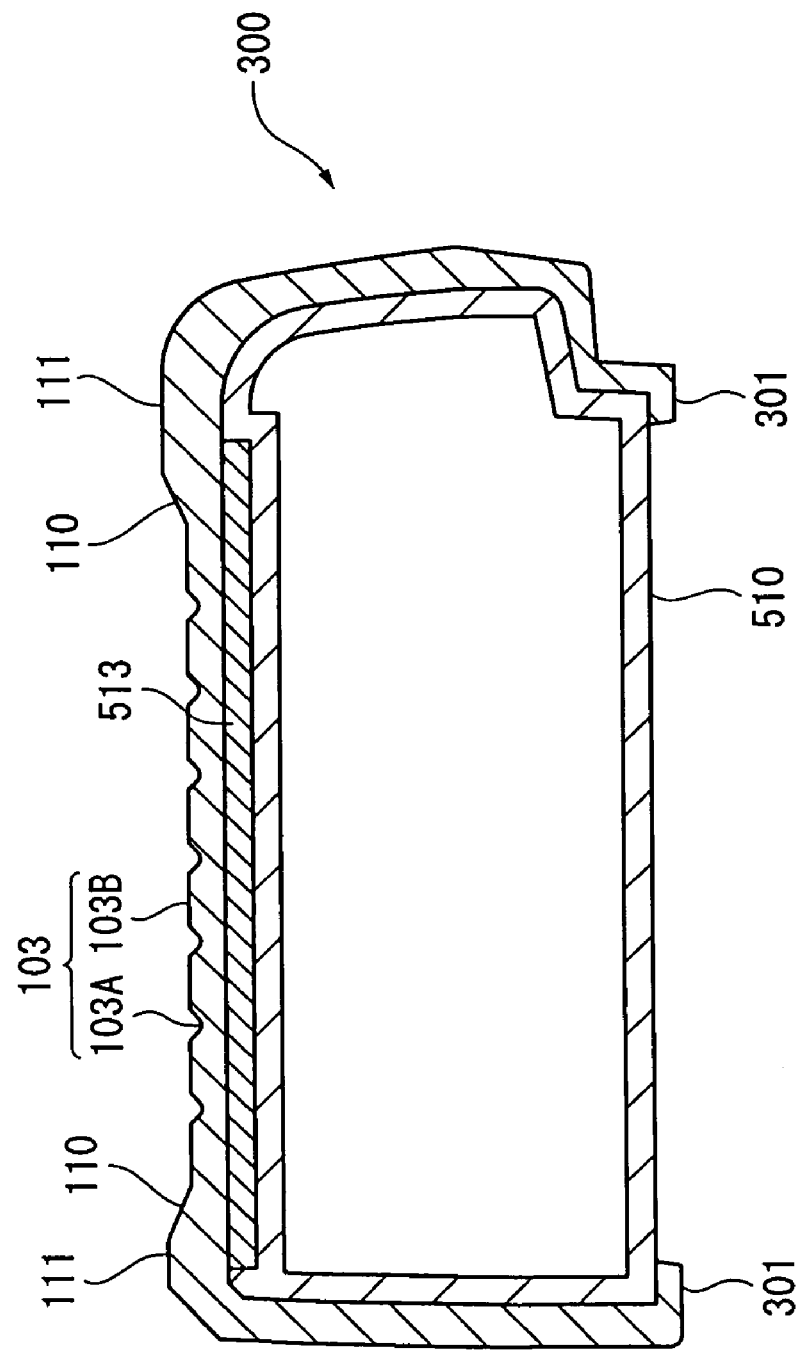
FIG. 10 shows the equivalent section of the third embodiment as the section taken along the line V-V in FIG. 2.

FIG. 9 shows the equivalent section taken along the line IV-IV in FIG. 2. FIG. 10 shows the equivalent section taken along the line V-V in FIG. 2.

The cover body 300 is formed of urethane and is molded integrally with the slider body 510 contacting closely with each other so that no gaps are left between the inner surface of the cover body 300 and the surface of the slider body 510. That is, the cover body 300 is molded by coinjection process integrally with the casing of the slider body 510. Accordingly, like the second embodiment, no concavities and convexities are formed on the inner surface of the cover body 300. On the outer surface of the cover body 300, the concavities and convexities 103 and 104 (refer to FIG. 2) are formed. Further, being different from the above-described embodiments, latching pieces 106 are not provided. According to the third embodiment, in place of the latching pieces 106, a bottom cover portion 301 as the surface protection section is formed so that the periphery of the bottom surface of the slider body 510 is covered entirely.

According to the third embodiment, in addition to the effects in the first and second embodiments, the following effects are obtained.

(15) In the first and second embodiments, the measuring instrument cover is arranged in detachable/attachable manner to the slider body 510 by means of the latching pieces 106. Therefore, as shown in FIG. 3, cover body 100 (or 200) cannot cover the bottom surface of the slider body 510, resultantly, the bottom surface of the slider body 510 is not protected against the shock from the outside. However, according to the third embodiment, the cover body 300 with the bottom cover portion 301 is molded integrally with the slider body 510, neglecting detachable/attachable function. By forming the bottom cover portion 301, the shock given to the bottom surface of the slider body 510 can be absorbed, and therefore, it is possible to reduce any shock given to the slider body 510 from any direction.

(16) Since the cover body 300 is molded by coinjection process integrally with the slider body 510, there is no gap therebetween; thus the oil and/or cooling fluid are prevented from penetrating therein.

Fourth Embodiment

Next, a fourth embodiment of the present invention will be described. The components equivalent to those of the above-described embodiments will be given with the same reference numerals and the description thereof will be omitted or made just simple.

Figure 11:
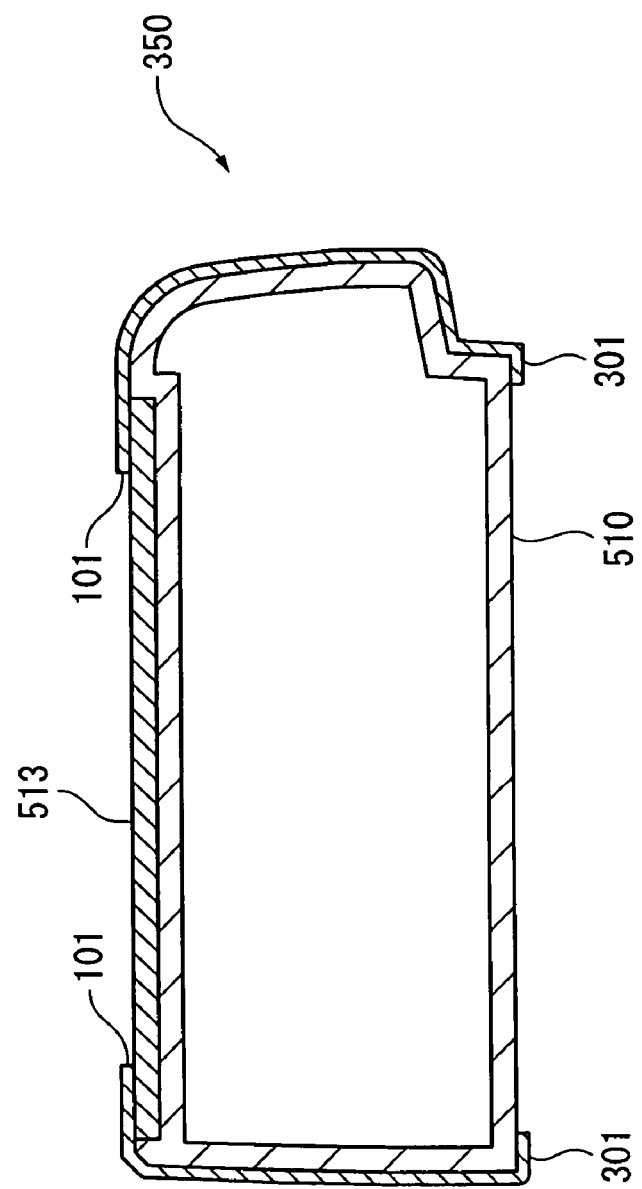
FIG. 11 shows the equivalent section of a fourth embodiment as the section taken along the line IV-IV in FIG. 2.
Figure 12:
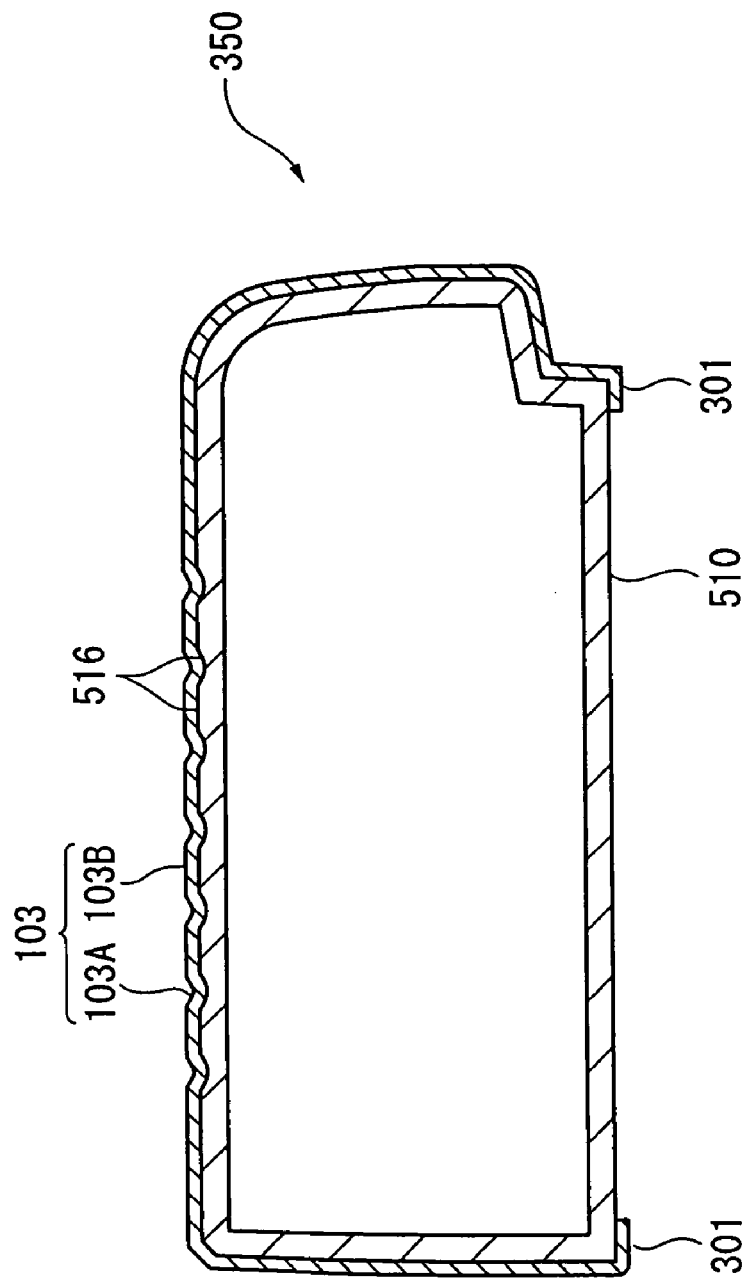
FIG. 12 shows the equivalent section of the fourth embodiment as the section taken along the line V-V in FIG. 2.

FIG. 11 shows the equivalent section taken along the line IV-IV in FIG. 2. FIG. 12 shows the equivalent section taken along the line V-V in FIG. 2.

A coating 350 is formed by painting urethane base paint material, which has elasticity after drying, on the surface of the casing of the slider body 510 as a part of the measuring instrument body. A coating 350 is formed with substantially a constant thickness. Being different from the above-described embodiments, any configuration equivalent to the tapered section 110 or the projected portion 111 is not formed. By the way, a casing of the slider body 510 is formed of an elastic member such as synthetic resin.

Further, as shown in FIG. 12, on the upper surface of the casing of the slider body 510, concavities and convexities 516 are formed. Since the coating 350 is formed along the shape of the concavities and convexities 516, the coating 350 has the configuration of concavities and convexities. Accordingly, on the surface of the coating 350, concavities and convexities 103 are formed.

According to the fourth embodiment, in addition to the effects in the above-described embodiments, the following effects are obtained.

(17) On the upper surface of the casing of the slider body 510, the concavities and convexities 516 are formed, and further the coating 350, which have the concavities and convexities 103 on the surface, are formed thereon. Since both of the casing of the slider body 510 and the coating 350 have elasticity, the concavities and convexities 516 and the concavities and convexities 103 can be deformed elastically when a shock is given from the outside. Therefore, the shock can be absorbed and reduced at the concavities and convexities 516 and 103.

(18) There reside no gaps between the surface of the casing of the slider body 510 and the coating 350, hence there is no risk of the oil and/or cooling fluid penetration.

(19) In the above-described embodiments, the tapered section 110 is formed in the vicinity of the opening 101 of the cover body so that the visibility of the digital display 511 is not obstructed due to the thickness of the cover body. According to the fourth embodiment, the coating 350 is formed along the surface of the casing of the slider body 510, and the thickness thereof may be formed thinner than the thickness of the cover body according to the above-described embodiments. Accordingly, the visibility of the digital display 511 is not obstructed due to the thickness of the coating 350, thus the usability thereof is enhanced.

The present invention is not limited to the above-described embodiments. Any change, modification or the like within the range where the object of the present invention can be achieved should be included in the present invention.

Figure 13:
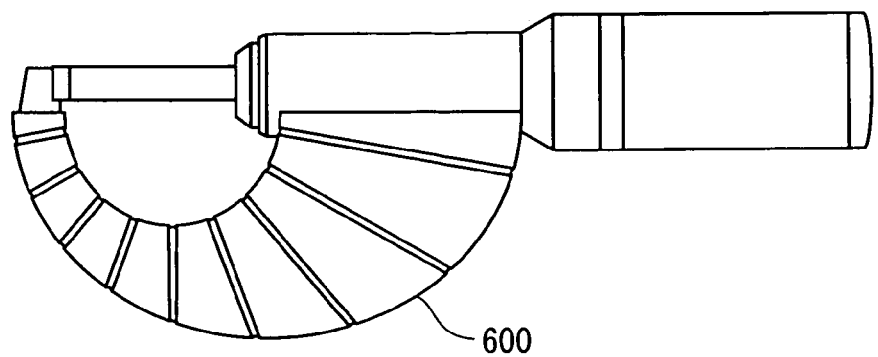
FIG. 13 shows an example in which a measuring instrument cover according to the present invention is applied to a frame cover of a micrometer.
Figure 14:
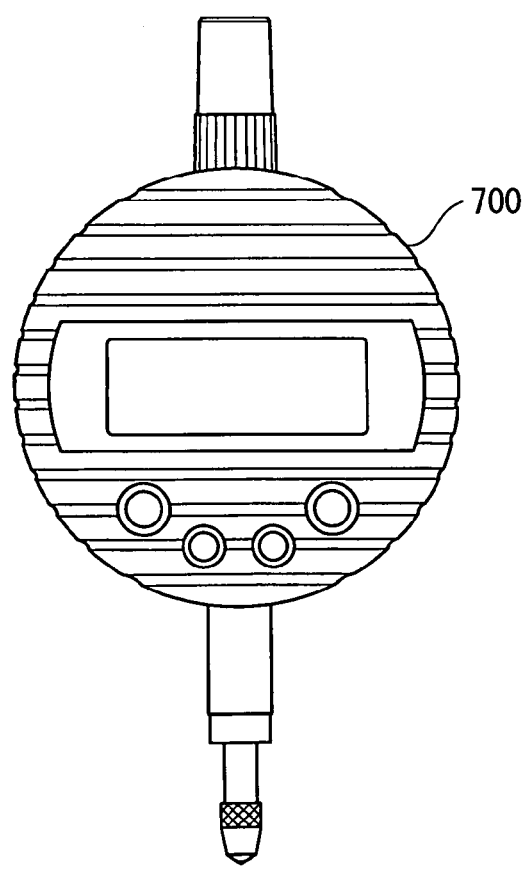
FIG. 14 shows an example in which a measuring instrument cover according to the present invention is applied to a casing body cover of a dial gauge.

The measuring instrument cover in the above-described embodiments is the cover of the slider body of the caliper. The measuring instrument cover according to the present invention may be utilized as a frame cover (cover body 600) of a micrometer as shown in FIG. 13, or as a casing body cover (cover body 700) of a dial gauge as shown in FIG. 14. In addition to the above, the present invention may be applied to a casing body cover of an indicator, or applied as a bezel with a shock absorbing function for a watch.

In the third and fourth embodiments, the bottom cover portion 301 is formed on the entire periphery of the bottom surface of the slider body 510. Accordingly, the measuring instrument cover is not detachable from the slider body 510.

However, the measuring instrument cover may be arranged so as to be detachable by adopting a two-piece structure. Or the measuring instrument cover may be arranged so as to be detachable by forming the bottom cover portion in a part of the periphery of the bottom surface, not the whole of the periphery.

For example, by forming the bottom cover portion 301 along only two parallel edges of the four edges of the bottom surface of the slider body 510, the measuring instrument cover may be arranged so as to be detachable by sliding operation of the slider body 510 in the direction parallel to the two edges and the like. Or, if the measuring instrument cover is formed of a material having elasticity, the measuring instrument cover may be attached/detached by opening the bottom cover portion 301 manually.

In the third and fourth embodiment, bottom cover portion 301 as the surface protection sections is formed on the bottom surface of the slider body 510. However, the surface protection sections may be formed on the other surfaces.

The material of the elastic member for forming the cover body 100, 200 or 300 is not limited to the materials used in the above-described embodiments. For example, the material may be appropriately selected from an engineering plastic, a lightweight metal such as aluminum alloy, wood or the like.

The priority application Number JP2004-021601 upon which this patent application is based is hereby incorporated by reference.

What is claimed is:

1. A measuring instrument cover, comprising:
   a cover body formed of an elastic member for covering at least a part of a measuring instrument, the cover body comprising a first side and a second side, wherein the first side is an outer surface and the second side is an inner surface opposite to the first side,
   wherein concavities and convexities are formed on at least one of the inner surface of the cover body, which abuts the measuring instrument, or the outer surface of the cover body,
   wherein the measuring instrument includes a display section for displaying measured values,
   wherein the cover body defines a first opening for exposing the display section and a side wall entirely surrounding the periphery of the first opening and entirely covering lateral sides of the measuring instrument approximately orthogonal to the first side,
   wherein a tapered section is formed on the outer surface in the vicinity of the opening,
   wherein a thickness of the tapered section becomes thinner toward the opening, and
   wherein the second side of the cover body is open such that the cover body is attachable to and detachable from the measuring instrument such that the cover body opening is aligned with the display section of the measuring device.

2. The measuring instrument cover according to claim 1, wherein
   the concavities and convexities formed on the inner surface of the cover body form at least one spillway, and
   at least one end of said at least one spillway is open.

3. The measuring instrument cover according to claim 2, wherein
   an other end of the at least one spillway is closed in the vicinity of the opening.

4. The measuring instrument cover according to claim 1, wherein
   the cover body includes an inner surface side and an outer surface side, and wherein an outer layer is molded on the outer surface side and an inner layer is molded integrally with the outer layer on the inner surface side, wherein the outer layer is formed from a hard elastic member and is formed with the concavities and convexities on the outer surface thereof, and
the inner layer is formed from a soft elastic member.

5. The measuring instrument cover according to claim 1, wherein
   the cover body is molded integrally with the measuring instrument so that the cover body inner surface comes into close contact with a surface of the measuring instrument, and
   the concavities and convexities are formed on the cover body outer surface.

6. The measuring instrument cover according to claim 1, wherein
   the cover body defines an opening at one face side of the measuring instrument through which the measuring instrument one face side is exposed, and
   wherein the cover body further comprises a surface protection section, said surface protection section surrounding the opening so as to cover a periphery of the one face side of the measuring instrument.

7. The measuring instrument cover according to claim 1, wherein the first side of the cover body is unsymmetrical relative to the center of the opening.

8. The measuring instrument cover according to claim 7, wherein the cover body includes a second opening open to the first side, the second opening exposing a display switch of the measuring instrument.

9. The measuring instrument cover according to claim 1, wherein the cover body includes an upper surface entirely surrounding the first opening and a side surface entirely covering sides of the measuring instrument that are approximately orthogonal to the first opening.

10. A measuring instrument, comprising:
    a measuring instrument body having concavities and convexities on at least a part of a surface thereof, and
    an elastic coating, said elastic coating being provided on the part of the measuring instrument body surface having concavities and convexities such that said concavities and convexities of the instrument body surface are likewise formed on an outer surface of said elastic coating.

11. A measuring instrument cover, comprising:
    a cover body formed of an elastic member for covering at least a part of a measuring instrument, wherein
    concavities and convexities are formed on at least one of an inner surface of the cover body, which abuts the measuring instrument, and an outer surface on a side of the cover body opposite to the inner surface, and wherein
    the cover body includes an inner surface side and an outer surface side, and an outer layer is molded on the outer surface side and an inner layer is molded integrally with the outer layer on the inner surface side,
    the outer layer is formed from a hard elastic member and is formed with the concavities and convexities on the outer surface thereof, and
    the inner layer is formed from a soft elastic member.

* * * * *